US008791936B2

(12) United States Patent
Zhao et al.

(10) Patent No.: US 8,791,936 B2
(45) Date of Patent: Jul. 29, 2014

(54) LCD MODULE AND METHOD FOR ADJUSTING RESPONSE TIME PERIOD THEREOF

(75) Inventors: Dengxia Zhao, Shenzhen (CN); Yu Wu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 471 days.

(21) Appl. No.: 13/147,483

(22) PCT Filed: Apr. 6, 2011

(86) PCT No.: PCT/CN2011/072459
§ 371 (c)(1), (2), (4) Date: Aug. 2, 2011

(87) PCT Pub. No.: WO2012/119330
PCT Pub. Date: Sep. 13, 2012

(65) Prior Publication Data

US 2012/0223932 A1 Sep. 6, 2012

(30) Foreign Application Priority Data

Mar. 4, 2011 (CN) .......................... 2011 1 0053393

(51) Int. Cl.

*G06F 3/038* (2013.01)
*G09G 5/00* (2006.01)
*G09G 3/36* (2006.01)
*G05F 1/10* (2006.01)
*G05F 3/02* (2006.01)

(52) U.S. Cl.
USPC ............ 345/212; 323/303; 345/101; 327/539

(58) Field of Classification Search
USPC .......................................................... 345/212
See application file for complete search history.

(56) References Cited

U.S. PATENT DOCUMENTS 5,198,747 A * 3/1993 Haight .......................... 323/303
7,705,662 B2 * 4/2010 Ng et al. ....................... 327/539
7,755,592 B2 * 7/2010 Ham ............................ 345/101

FOREIGN PATENT DOCUMENTS

| | | | |
|---|---|---|---|
| CN | 1896813 | A | 1/2007 |
| CN | 101290412 | A | 10/2008 |
| CN | 101324715 | A | 12/2008 |
| JP | 10301094 | A | 11/1998 |
| JP | 3068465 | B2 | 7/2000 |
| JP | 2000338518 | A | 12/2000 |

* cited by examiner

*Primary Examiner* — Charles V Hicks
(74) *Attorney, Agent, or Firm* — Sughrue Mion, PLLC

(57) ABSTRACT

The present invention relates to a LCD module and a method thereof. The LCD module includes a gate driver, a liquid crystal display panel having a plurality of pixel units, a temperature sensor for generating a temperature sensing signal based on a temperature of the liquid crystal display panel, and a voltage regulator for adjusting scan voltage according to the temperature sensing signal. The gate driver outputs a scan signal with the adjusted scan voltage to the plurality of pixel units. The LCD module can adjust the scan voltage based on a variety of the temperature of the LCD panel to further change current charging the pixel units, shortening a response time period of the LCD module.

17 Claims, 3 Drawing Sheets

LCD MODULE AND METHOD FOR ADJUSTING RESPONSE TIME PERIOD THEREOF

BACKGROUND OF THE INVENTION

1. Field of the Invention

The present invention relates to a liquid crystal display (LCD) module and a method for adjusting a response time period thereof.

2. Description of Prior Art

An advanced monitor with multiple functions is an important feature for use in current consumer electronic products. Liquid crystal display (LCD) devices which are colorful monitors with high resolution are widely used in various electronic products such as monitors for mobile phones, personal digital assistants (PDAs), digital cameras, laptop computers, and notebook computers.

A conventional LCD module comprises an LCD panel, a gate driver, and a source driver. The LCD panel comprises a plurality of pixel units. The gate driver supplies the plurality of pixel units with a scan signal. The source driver outputs a data signal to the plurality of pixel units to display images. Generally speaking, when the temperature of an LCD panel varies, values of viscosity coefficients of liquid crystals and equivalent capacitances change. This may result in variations of the response time period of the liquid crystals as well. How to adjust the response time period of the liquid crystals according to variations in temperature of an LCD panel is a technical problem for LCD module manufacturers.

SUMMARY OF THE INVENTION

To solve the technical problem that the response time period of the conventional LCD module changes with the temperature of the LCD panel, the present invention provides an LCD module capable of adjusting the response time period of liquid crystals according to temperature variations of an LCD panel and a method for adjusting the response time period thereof.

According to the present invention, a liquid crystal display module comprises a gate driver and a liquid crystal display panel having a plurality of pixel units, a transistor mounted on the LCD panel, a first error amplifier, an analog to digital converter, and a voltage regulator. A voltage difference between a gate and a source of the transistor varies with temperature. The first error amplifier having two input terminal electrically connected to the gate and the source of the transistor respectively, is used for outputting an amplified value of the voltage difference between the gate and the source of the transistor. The analog to digital converter is used for receiving the amplified value of the voltage difference and for outputting a corresponding binary signal, the corresponding binary signal being the temperature sensing signal; the voltage regulator is used for adjusting scan voltage according to the temperature sensing signal. The gate driver outputs a scan signal with the adjusted scan voltage to the plurality of pixel units.

In one aspect of the present invention, the liquid crystal display module further comprises a constant current generator electrically connects to the gate and the drain of the transistor to feed a predetermined voltage, the source of the transistor receives a reference voltage, a relation between the predetermined voltage and the reference voltage complying with a conducting criterion of the transistor.

In one aspect of the present invention, the voltage regulator comprises a digital to analog converter having an input terminal coupling to an output terminal of the analog to digital converter, for outputting an analog voltage, a feedback circuit for generating a feedback voltage upon receiving the scan voltage, a second error amplifier for outputting an amplified value of a voltage difference between the analog voltage and the feedback voltage; and a scan voltage generator for adjusting the scan voltage according to the amplified value of the voltage difference from the second error amplifier.

In one aspect of the present invention, the transistor is a thin film transistor.

In one aspect of the present invention, the transistor is mounted on a position of the LCD panel where a mean temperature of the LCD panel is capable of being sensed.

According to the present invention, a method of adjusting a response time period of an LCD module comprises following steps: using a temperature sensor to sense a temperature of a LCD panel and to generate a temperature sensing signal; using a voltage regulator to adjust scan voltage according to the temperature sensing signal; and using a gate driver to output a scan signal having the adjusted scan voltage to a plurality of pixel units of the LCD panel.

In one aspect of the present invention, the steps of using the temperature sensor to sense the temperature of the LCD panel and to generate the temperature sensing signal comprises: mounting a transistor on a position where the temperature of the LCD panel is capable of being sensed, the voltage difference between the gate and the source of the transistor changing with temperature; using a first error amplifier to calculate the voltage difference between the gate and the source and to output an amplified value of the voltage difference; and using an analog to digital converter (ADC) to receive the amplified value of the voltage difference and to output a corresponding binary signal, the corresponding binary signal being the temperature sensing signal.

In one aspect of the present invention, the step of using the temperature sensor to sense the temperature of the LCD panel and to generate the temperature sensing signal further comprises: using a constant current generator to provide a predetermined voltage to a drain of the transistor, and providing a reference voltage to a source and a gate of the transistor, a relation between the predetermined voltage and the reference voltage complying with a conducting criterion of the transistor.

In one aspect of the present invention, the reference voltage is a common voltage applied on the LCD panel from a driving chip of the LCD module.

In one aspect of the present invention, the step of using the temperature sensor to sense the temperature of the LCD panel and to generate the temperature sensing signal comprises: mounting a transistor on a position where the temperature of the LCD panel is capable of being sensed, the voltage difference between the gate and the source of the transistor changing with temperature; using a first error calculator to calculate the voltage difference between the gate and the source; and using an analog to digital converter to receive the voltage difference and to output a corresponding binary signal, the corresponding binary signal being the temperature sensing signal.

In one aspect of the present invention, the step of using a voltage regulator to adjust the scan voltage according to the temperature sensing signal comprises: using a digital to analog converter (DAC) to transform the temperature sensing signal into an analog voltage; using a second error amplifier to compare the analog voltage with a feedback voltage when the scan voltage is feed-backed by a feedback circuit and to output an amplified value of a voltage difference between the analog voltage and the feedback voltage; and using a scan voltage generator to adjust the scan voltage according to the amplified value of the voltage difference.

In one aspect of the present invention, the step of using a voltage regulator to adjust the scan voltage according to the temperature sensing signal comprises: using a digital to analog converter (DAC) to transform the temperature sensing signal into an analog voltage; using a second error amplifier to compare the analog voltage with a feedback voltage when the scan voltage is feed-backed by a feedback circuit and to output a voltage difference between the analog voltage and the feedback voltage; and using a scan voltage generator to adjust the scan voltage according to the voltage difference.

According to the present invention, a liquid crystal display module comprises a gate driver and a liquid crystal display panel having a plurality of pixel units, a temperature sensor for generating a temperature sensing signal based on a temperature of the liquid crystal display panel, and a voltage regulator for adjusting scan voltage according to the temperature sensing signal, the gate driver outputs a scan signal with the adjusted scan voltage to the plurality of pixel units.

In one aspect of the present invention, the temperature sensor comprises a transistor mounted on the LCD panel, a voltage difference between a gate and a source of the transistor changing with temperature, a first error amplifier having two input terminal electrically connected to the gate and the source of the transistor respectively, for outputting the voltage difference between the gate and the source of the transistor, and an analog to digital converter for receiving the voltage difference and for outputting a corresponding binary signal, the corresponding binary signal being the temperature sensing signal.

In one aspect of the present invention, the voltage regulator comprises a digital to analog converter having an input terminal coupling to an output terminal of the analog to digital converter, for outputting an analog voltage, a feedback circuit for generating a feedback voltage upon receiving the scan voltage, a second error amplifier for outputting a voltage difference between the analog voltage and the feedback voltage, and a scan voltage generator for adjusting the scan voltage according to the voltage difference from the second error amplifier.

The present invention has an advantage that the LCD module of the present invention comprises a temperature sensor and a voltage regulator. The temperature sensor outputs a temperature sensing signal according to the temperature of the LCD panel. The voltage regulator adjusts scan voltage according to the temperature sensing signal. A scan driving circuit outputs scan signal having the scan voltage to a plurality of pixel units to regulate the charging current to charge the pixel units, shortening the response time period of the LCD module.

These and other features, aspects and advantages of the present disclosure will become understood with reference to the following description, appended claims and accompanying figures.

DETAILED DESCRIPTION OF THE PREFERRED EMBODIMENTS

The preferred embodiments of a liquid crystal module and a method thereof according to the present invention are described as follow with accompanying figures.

Figure 1:
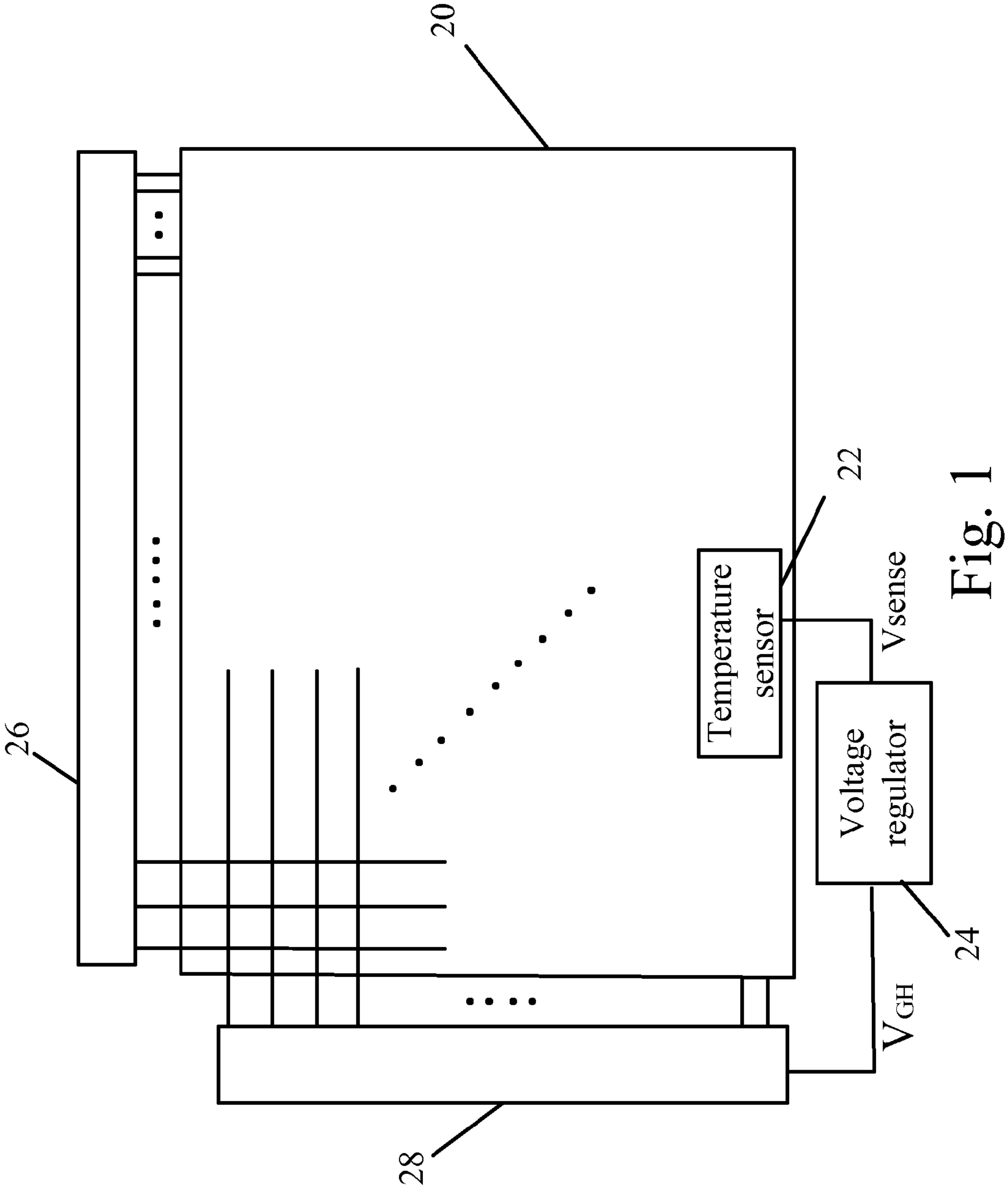
FIG. 1 is a structural diagram showing an LCD module according to a preferred embodiment of the present invention.

FIG. 1 is a structural diagram showing an LCD module 10 according to a preferred embodiment of the present invention. The LCD module 10 comprises an LCD panel 20, a temperature sensor 22, a voltage regulator 24, a source driver 26, and a gate driver 28. The LCD panel 20 comprises a plurality of pixel units (unlabeled). The gate driver 28 generates scan signals and outputs them to the plurality of pixel units. Meanwhile, the source driver 26 transmits data signals to the plurality of pixel units to display images. The temperature sensor 22 which is mounted on the LCD panel 20 generates a temperature sensing signal $V_{sense}$ according to the temperature of the LCD panel 20. The voltage regulator 24 adjusts scan voltage $V_{GH}$ according to the temperature sensing signal $V_{sense}$ to regulate the charging current of the plurality of pixel units.

Figure 2:
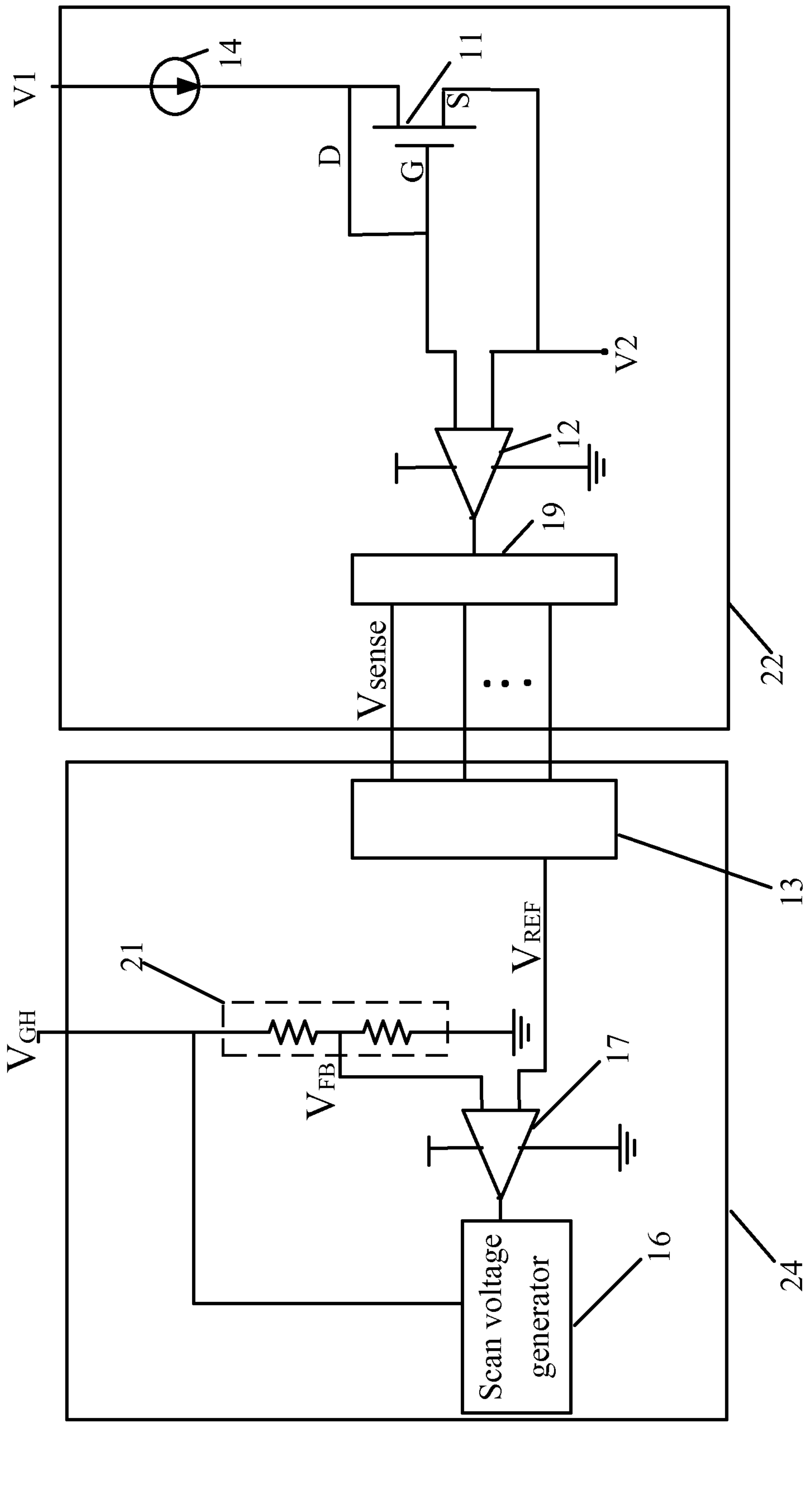
FIG. 2 is a circuit diagram showing the temperature sensor and the voltage regulator of the LCD module.

Refer to FIG. 2, which is a circuit diagram showing the temperature sensor 22 and the voltage regulator 24 of the LCD module 10. The temperature sensor 22 comprises a thin film transistor (TFT) 11, a first error amplifier 12, an analog to digital converter (ADC) 19, and a constant current generator 14. A source S of the TFT 11 is electrically connected to a first voltage input terminal (unlabeled) of the first error amplifier 12. A gate G and a drain D of the TFT 11 are electrically connected together and further electrically connected to a second voltage input terminal (unlabeled) of the first error amplifier 12. The drain. D of the TFT 11 is fed a predetermined voltage V1 from driving chips of the LCD module 10 via the constant current generator 14. The source S is fed a reference voltage V2 from the driving chips of the LCD module 10. Preferably, the reference voltage V2 can be the common voltage applied on the LCD panel 20. A voltage output terminal (unlabeled) of the first error amplifier 12 is electrically connected to an analog voltage input terminal (unlabeled) of the ADC 19. The TFT 11 is mounted on the LCD panel 20.

The voltage regulator 24 comprises a digital to analog converter (DAC) 13, a second error amplifier 17, a feedback circuit 21, and a scan voltage generator 16. A plurality of binary signal input terminals (unlabeled) of the DAC 13 is electrically connected to a plurality of binary signal output terminals (unlabeled) of the ADC 19. A first voltage input terminal of the second error amplifier 17 receives the analog voltage output by the DAC 13. A second voltage input terminal of the second error amplifier 17 receives the feedback voltage $V_{FB}$ of the scan voltage $V_{GH}$ output by the feedback circuit 21. The scan voltage generator 16 which is electrically connected to a voltage output terminal of the second error amplifier 17 generates corresponding scan voltage $V_{GH}$ according to the voltage output by the second error amplifier 17. The scan voltage generator 16 is integrated in the DC/DC converter (not shown) of the LCD module 10.

Figure 3:
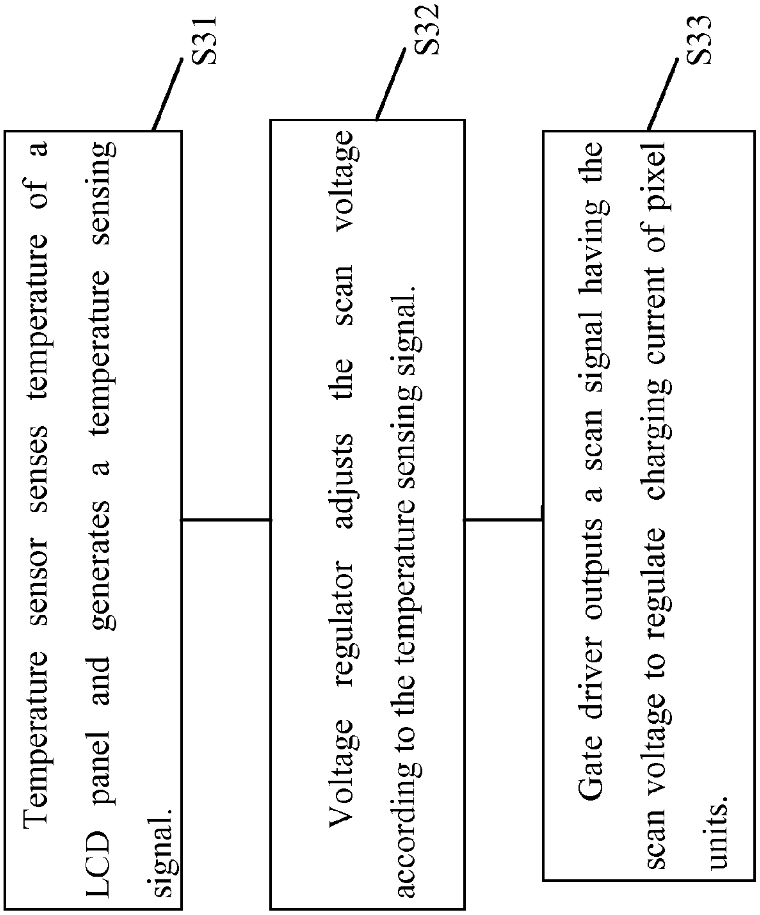
FIG. 3 is a flow chart of showing an adjustment method for the response time period of the LCD module.

FIG. 3 is a flow chart of showing an adjustment method for the response time period of the LCD module 10. The adjustment method comprises the following steps: Step S31: The temperature sensor 22 senses the temperature of the LCD panel 20 and generates a temperature sensing signal $V_{sense}$. Step S32: The voltage regulator 24 adjusts the scan voltage $V_{GH}$ according to the temperature sensing signal $V_{sense}$. Step S33: The gate driver 28 outputs a scan signal having the scan voltage $V_{GH}$ to regulate the charging current of the pixel units.

Refer to FIGS. 1, 2, and 3. The adjustment method for the response time period of the LCD module 10 is elaborated as follows:

Step S31: The TFT 11 is mounted on the LCD panel 20. If the temperature of the LCD panel 20 is evenly distributed, the TFT 11 can be mounted on any position of the LCD panel 20. If the temperature of the LCD panel 20 is unevenly distributed, the TFT 11 can be mounted on a position which reflects the mean temperature of the LCD panel 20 based on demand. The drain D of the TFT 11 receives the predetermined voltage V1 through the constant current generator 14. The source S receives the reference voltage V2. The gate G is electrically connected to the drain D. The relation between the predetermined voltage V1 and the reference voltage V2 complies with conducting conditions of the TFT 11.

In the TFT 11, the voltage Vgs between the source S and the gate G is a function of temperature. The function can be simplified as $V_{gs}=V_{gs0}+aT$ where $V_{gs0}$ is the voltage corresponding to the voltage between the source S and the gate G at room temperature, and a is the temperature coefficient of the voltage. According to $\Delta Vgs=a\cdot\Delta T$, the temperature variation $\Delta T$ of the LCD panel 20 sensed by the TFT 11 causes variations $\Delta Vgs$ in the voltage difference between the source S and the gate G. In other words, the voltage difference between the source S and the gate G of the TFT 11 changes correspondingly with the temperature of the LCD panel 20. The first voltage input terminal and the second voltage input terminal of the first error amplifier 12 are fed the voltage from the source S of the TFT 11 and from the gate G of the TFT 11, respectively, and output an amplified value of the voltage difference between the voltage of the gate G and the voltage of the source S.

The ADC 19 receives the amplified value of the voltage difference output by the first error amplifier 12 and outputs a corresponding binary signal according to the amplified value of the voltage difference at different temperatures. The binary signal can be regarded as the temperature sensing signal $V_{sense}$.

Step S32: The DAC 13 transforms the temperature sensing signal $V_{sense}$ output by the temperature sensor 22 into an analog voltage $V_{REF}$. The first voltage input terminal of the second error amplifier 17 receives the analog voltage $V_{REF}$. The second voltage input terminal of the second error amplifier 17 receives the feedback voltage $V_{FB}$ output by the feedback circuit 21. The second error amplifier 17 compares the analog voltage $V_{REF}$ with the feedback voltage $V_{FB}$ generated when the scan voltage $V_{GH}$ is feed-backed by the feedback circuit, and transmits the amplified error voltage to the scan voltage generator 16. The variation in temperature produces different temperature sensing signals $V_{sense}$, so the analog voltage $V_{REF}$ changes at different temperatures. Accordingly, the difference in voltage output by the second error amplifier 17 differs at different temperatures. The scan voltage generator 16 adjusts the scan voltage $V_{GH}$ according to the difference in voltage output by the second error amplifier 17. The feedback voltage $V_{FB}$ varies whenever the scan voltage $V_{GH}$ varies. The scan voltage $V_{GH}$ and the feedback voltage $V_{FB}$ change by loop until the scan voltage $V_{GH}$ becomes stable at the current temperature.

Step 33: The gate driver 28 outputs a scan signal having the scan voltage $V_{GH}$ to regulate the charging current $I_{CH}$ of the plurality of pixel units.

$$I_{CH} = \frac{\mu C_{ox} W}{L} \times (V_{GH} - V_{TH}) \times V_{DS},$$

where $C_{OX}$ is an oxide capacitance; μ is an electron mobility; W and L are the channel width and the channel length of the TFT of the pixel units, respectively; $V_{TH}$ is the threshold voltage of the TFT; $V_{DS}$ is the voltage difference between the drain D and the source S of the TFT. As the equation shows, the charging current $I_{CH}$ of the pixel units varies with the scan voltage $V_{GH}$.

In conclusion, the LCD module 10 comprises the temperature sensor 22 and the voltage regulator 24. The temperature sensor 22 outputs a temperature sensing signal according to the temperature of the LCD panel 20. The voltage regulator 24 adjusts the scan voltage $V_{GH}$ according to the temperature sensing signal. The gate driver 28 outputs a scan signal having the scan voltage $V_{GH}$ to the plurality of pixel units to regulate the charging current $I_{CH}$ of the pixel units to improve the response time period of the LCD module 10.

In addition, the LCD module 10 uses the voltage difference between the gate G and the source S of the TFT 11 to reflect variations in the temperature of the LCD panel 20 to implement temperature sensing and further, to achieve low cost of manufacturing process, simple manufacturing, and small volume.

The described embodiment is a preferred one of the present invention. In other words, the LCD module of the present invention is not limited to this preferred embodiment. For example, the first error amplifier 12 can be replaced by an error calculator as long as the accuracy of the ADC 19 is fulfilled and the ADC 19 can output a corresponding binary signal according to the voltage difference between the gate G and the source S of the TFT 11 at different temperatures. The second error amplifier 17 can be replaced by an error calculator as long as the scan voltage generator 16 generates different scan voltages $V_{GH}$ according to the difference in voltage output by the error calculator. The TFT 11 can be replaced by any other transistor, such as a triode.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A liquid crystal display module comprising a gate driver and a liquid crystal display panel having a plurality of pixel units, characterized in that: the liquid crystal display (LCD) module further comprises a transistor mounted on the LCD panel, a first error amplifier, an analog to digital converter, and a voltage regulator; a voltage difference between a gate and a source of the transistor varies with temperature; the first error amplifier having two input terminal electrically connected to the gate and the source of the transistor respectively, is used for outputting an amplified value of the voltage difference between the gate and the source of the transistor; the analog to digital converter is used for receiving the amplified value of the voltage difference and for outputting a corresponding binary signal, the corresponding binary signal being the temperature sensing signal; the voltage regulator is used for adjusting scan voltage according to the temperature sensing signal; the gate driver outputs a scan signal with the adjusted scan voltage to the plurality of pixel units.

2. The liquid crystal display module of claim 1, characterized in that: the liquid crystal display module further comprises a constant current generator electrically connects to the gate and the drain of the transistor to feed a predetermined voltage, the source of the transistor receives a reference voltage, a relation between the predetermined voltage and the reference voltage complying with a conducting criterion of the transistor.

3. The liquid crystal display module of claim 1, characterized in that: the voltage regulator comprises:

a digital to analog converter having an input terminal coupling to an output terminal of the analog to digital converter, for outputting an analog voltage;

a feedback circuit for generating a feedback voltage upon receiving the scan voltage;

a second error amplifier for outputting an amplified value of a voltage difference between the analog voltage and the feedback voltage; and a scan voltage generator for adjusting the scan voltage according to the amplified value of the voltage difference from the second error amplifier.

4. The liquid crystal display module of claim 1, characterized in that: the transistor is a thin film transistor.

5. The liquid crystal display module of claim 1, characterized in that: the transistor is mounted on a position of the LCD panel where a mean temperature of the LCD panel is capable of being sensed.

6. A method of adjusting a response time period of an LCD module comprising following steps:

mounting a transistor on a position where a temperature of an LCD panel is capable of being sensed, a voltage difference between a gate and a source of the transistor changing with temperature;

using a first error amplifier to calculate the voltage difference between the gate and the source and to output an amplified value of the voltage difference;

using an analog to digital converter (ADC) to receive the amplified value of the voltage difference and to output a corresponding binary signal, the corresponding binary signal being an temperature sensing signal;

using a voltage regulator to adjust scan voltage according to the temperature sensing signal; and using a gate driver to output a scan signal having the adjusted scan voltage to a plurality of pixel units of the LCD panel.

7. The method of claim 6, characterized in that: the transistor is a thin film transistor.

8. The method of claim 6, characterized in that: the transistor is mounted on a position of the LCD panel where a mean temperature of the LCD panel is capable of being sensed.

9. The method of claim 6, characterized in that: the step of using the temperature sensor to sense the temperature of the LCD panel and to generate the temperature sensing signal further comprises: using a constant current generator to provide a predetermined voltage to a drain of the transistor, and providing a reference voltage to a source and a gate of the transistor, a relation between the predetermined voltage and the reference voltage complying with a conducting criterion of the transistor.

10. The method of claim 9, characterized in that: the reference voltage is a common voltage applied on the LCD panel from a driving chip of the LCD module.

11. The method of claim 6, characterized in that: the step of using a voltage regulator to adjust the scan voltage according to the temperature sensing signal comprises:

using a digital to analog converter (DAC) to transform the temperature sensing signal into an analog voltage;

using a second error amplifier to compare the analog voltage with a feedback voltage when the scan voltage is feed-backed by a feedback circuit and to output an amplified value of a voltage difference between the analog voltage and the feedback voltage; and using a scan voltage generator to adjust the scan voltage according to the amplified value of the voltage difference.

12. The method of claim 6, characterized in that: the step of using a voltage regulator to adjust the scan voltage according to the temperature sensing signal comprises:

using a digital to analog converter (DAC) to transform the temperature sensing signal into an analog voltage;

using a second error amplifier to compare the analog voltage with a feedback voltage when the scan voltage is feed-backed by a feedback circuit and to output a voltage difference between the analog voltage and the feedback voltage; and using a scan voltage generator to adjust the scan voltage according to the voltage difference.

13. A liquid crystal display module comprising a gate driver and a liquid crystal display panel having a plurality of pixel units, characterized in that: the liquid crystal display (LCD) module further comprises a temperature sensor for generating a temperature sensing signal based on a temperature of the liquid crystal display panel, and a voltage regulator for adjusting scan voltage according to the temperature sensing signal, the gate driver outputs a scan signal with the adjusted scan voltage to the plurality of pixel units; wherein the voltage regulator comprises:

a digital to analog converter having an input terminal coupling to an output terminal of the analog to digital converter, for outputting an analog voltage;

a feedback circuit for generating a feedback voltage upon receiving the scan voltage;

a second error amplifier for outputting a voltage difference between the analog voltage and the feedback voltage; and a scan voltage generator for adjusting the scan voltage according to the voltage difference from the second error amplifier.

14. The liquid crystal display module of claim 13, characterized in that: the temperature sensor comprises:

a transistor mounted on the LCD panel, a voltage difference between a gate and a source of the transistor changing with temperature;

a first error amplifier having two input terminal electrically connected to the gate and the source of the transistor respectively, for outputting the voltage difference between the gate and the source of the transistor; and an analog to digital converter for receiving the voltage difference and for outputting a corresponding binary signal, the corresponding binary signal being the temperature sensing signal.

15. The liquid crystal display module of claim 14, characterized in that: the transistor is a thin film transistor.

16. The liquid crystal display module of claim 14, characterized in that: the transistor is mounted on a position of the LCD panel where a mean temperature of the LCD panel is capable of being sensed.

17. The liquid crystal display module of claim 14, characterized in that: the temperature sensor further comprises a constant current generator electrically connects to the gate and the drain of the transistor to feed a predetermined voltage, the source of the transistor receives a reference voltage, a relation between the predetermined voltage and the reference voltage complying with a conducting criterion of the transistor.

* * * * *